Patented Feb. 16, 1954

2,669,519

UNITED STATES PATENT OFFICE 2,669,519

GELLING COMPOSITIONS

George L. Baker, Newark, Del., assignor to Seaplant Chemical Corporation, New Bedford, Mass., a corporation of Delaware No Drawing. Application April 26, 1952,
Serial No. 284,638

4 Claims. (Cl. 99—131)

This invention relates to the preparation of strong, elastic gels, mainly for food purposes, from various seaweed extractives, normally capable of producing only non-yielding, non-cohesive, brittle gels, by the interaction of red seaweeds of the type activated by a potassium salt with red seaweeds passive to the action of such a salt.

Various red seaweed extractives like agar-agar possess the capacity to produce gels at temperatures below 100° F. which are reversible upon heating. However, these gels are of a non-yielding, brittle character of relatively low breaking strength and with little elasticity. For food uses their eating quality is low because, in order to have a gel strong enough to hold together on removal from its container, the gel is necesarily stiff and too unyielding. For high eating quality, a gel must be tender, yet cohesive, and, therefore, must be elastic while having relatively low breaking strength.

The breaking strength of gels from geloses, like those from the agars and certain other red seaweeds such as Furcellaria, is not improved by the addition of a cation-containing salt, such as potassium or ammonium salt, as is the strength of gels from geloses from *Chondrus crispus* (Irish moss) or *Hypnea musciformis*. Also neutral high polymers when combined with the gelose from agars or Furcellaria will increase the breaking strength but not the elasticity of their gels. Only in the case of the gels made with Irish moss gelose or the Hypnea gelose will the elasticity, as well as the breaking strength of the gels, be increased upon incorporating simultaneously the above named cations and a neutral high polymer with their geloses.

An object of this invention is to develop elasticity in gels made from powdered compositions containing geloses of any of the red seaweeds. Also, an object is to produce gels from agar type geloses with better gel characteristics. Another object is to use geloses from miscellaneous red seaweeds as extenders for Irish moss gelose in powdered gelling compositions which will produce elastic gels consisting of mixed gelose, a neutral high polymer, and a potassium salt. A further objective is to incorporate various red seaweed geloses with Irish moss gelose, a neutral high polymer and potassium chloride in powdered compositions for producing elastic gelled food products.

Gelling compositions consisting of three elements, namely, gelose from Irish moss, a high polymer and cations in a common system are known; such three-element compositions being disclosed in Baker Patent 2,466,146. It has now been discovered that gelose from certain red seaweeds such as agar (obtained principally from *Gelidium amansii*) can replace up to two-thirds of the Irish moss gelose in the prior known three-element system to provide a four-element gel composition superior in the characteristics of cohesiveness, strength, and eating quality. This is an unexpected result because a potassium salt or other similar cation-containing salt is of negligible value in gels made from agar gelose or made from agar gelose plus a neutral high polymer.

It has also been discovered that in order to produce the four-element composition having the superior qualities above mentioned, at least one-third, or more, of the gelose in the four-element composition must be a gelose whose gelling capacity is favorably influenced by the addition of a gel-inducing cation-containing salt, such as potassium chloride. Gelose of this type, i. e., favorably influenced by proper cation addition, is obtained from the red seaweeds *Chondrus crispus* (Irish moss), *Hypnea musciformis*, and the like. Extractives or geloses from *Chondrus crispus*, *Hypnea musciformis*, and a Japanese weed identified as Tsunomata, and the like, will induce elasticity in a gel without reducing strength. However, they are more expensive than agar such as obtained from *Gelidium amansii*, for example. But gels made from agar alone or from agar plus a neutral polymer while developing strength do not develop increased elasticity even when a potassium salt is added to the composition.

It has been found that if agar is combined with Irish moss gelose, a neutral high polymer and a potassium salt in the proportions hereinafter set forth to form a four-element composition which includes Irish moss gelose, agar, neutral high polymer, and potassium salt, there results a gelling composition having superior characteristics of cohesiveness, strength, and eating quality.

The first element is preferably a gelose from either an Irish moss extractive or an extractive of *Hypnea musciformis*. Other geloses activated by the potassium ion may be used, for instance, Tsunomata.

The second element is an agar from a wider choice of agar-type seaweeds: *Gelidium amansii*, *Gelidium cartilagineum*, *Gelidium nudifroms* and *Gracilaria confervoides* represent the most important source. An extractive of a species of Furcellaria, called "Danagar," has also been tested and found satisfactory.

For the neutral high polymer, locust bean gum is the most satisfactory yet found.

Potassium chloride has been found the best source of the gel-inducing potassium ion. This inexpensive salt is available in a high degree of purity. Other salts of potassium which may be used are those of acetic, citric, lactic, malic and tartaric acids.

When these four elements of the composition are brought together as the basic ingredients of a gel system and the gelose and agar are present in the fractions according to this discovery, gel strength, gel cohesiveness and gel elasticity are greatly improved over the use of gelose of the agar type and neutral high polymer alone. An improvement in the strength of gels follows the use of a neutral high polymer with agar, but the improvement in elasticity and cohesiveness occurs only when the Irish moss type of gelose is present.

Acids may be added to the four ingredients of the composition provided the pH of the gel system produced therefrom is not less than 3.5. Acid in excess of the amount necessary to reduce the pH to this point is to be avoided, otherwise the strength of the gels will be impaired excessively. Buffer salts, such as sodium citrate or sodium tartrate, will aid in counteracting the effects of too much acid. The range of pH of desired usefulness is 3.5 to 7.

The following examples are illustrative of compositions made according to the invention, all of which produce gels of strength 40 g./cm.$^2$ plunger area and a sag or elasticity of 15 to 25 percent.

*Example 1*

| | Parts |
|---|---|
| Gelose type 1, Irish moss extractive | 1.3 |
| Gelose type 2, agar-agar | 2.6 |
| Neutral high polymer, locust bean gum | 3.0 |
| Potassium chloride | 2.0 |

These ingredients are mixed and blended. In order to make a gel, 991.1 parts of water are added to the composition and the solution heated to boiling and cooled for gelation, or boiling water is added to the composition and after the composition is dispersed and dissolved a gel will form on cooling.

*Example 2*

| | Parts |
|---|---|
| Gelose type 1, *Hypnea musciformis* | 0.8 |
| Gelose type 2, agar-agar | 1.6 |
| Neutral high polymer, locust bean gum | 3.0 |
| Potassium chloride | 2.0 |

These ingredients are mixed and blended. In order to make a gel, 992.5 parts of water are added to the composition and the mixture is heated to boiling with stirring for dispersion and solution. Upon cooling a gel will form. Boiling water may be added, if desired, as in Example 1.

*Example 3*

| | Parts |
|---|---|
| Gelose type 1, Irish moss extractive | 1 |
| Gelose type 2, Danagar | 2 |
| Neutral high polymer, locust bean gum | 3 |
| Potassium chloride | 2 |

These ingredients are mixed and blended. In order to make a gel, 992 parts of water are added to the composition and the mixture is heated to boiling with stirring for dispersion and solution. Upon cooling a gel will form. Boiling water may be added, if desired, as in Example 1.

In the following fourth example, it is shown that sugar, buffer salt, and acid may be added to the composition. The composition may be flavored and colored, if desired, or a fruit juice or other flavoring and coloring matter may be added to the composition as the liquid needed in the gel system made from the composition, thus:

*Example 4*

| | Parts |
|---|---|
| Gelose type 1, Irish moss extractive | 3.0 |
| Gelose type 2, agar-agar | 1.5 |
| Neutral high polymer, locust bean gum | 3.0 |
| Potassium chloride | 2.0 |
| Sugar, sucrose or dextrose | 10.0 |
| Buffer salt, sodium citrate | 2.0 |
| Citric acid | 1.5 |

These ingredients are mixed and blended. In order to make a gel 977 parts of grape juice are added to the composition and the mixture is heated to boiling with stirring for dispersion and solution of the composition. Upon cooling a gel will form. The grape juice, or other juice, might be heated to boiling and added to the composition in lieu of heating with the composition. Water might be substituted for the fruit juice. The buffer salt and acid are not absolutely needed if fruit juice is used.

The basic composition as given in these examples is made up of four ingredients: (1) type 1 gelose, activated by a potassium salt; (2) type 2 gelose, agar type; (3) neutral high polymer, and (4) potassium salt. Sugar, coloring, flavoring, liquid, etc., are considered as extraneous materials affecting flavor, color, etc., of gels and unnecessary to the invention.

Considering the first two ingredients only, type 1 gelose must make up from 33 to about 66 percent of the total gelose fraction in the composition for development of the elasticity characteristic in gels made from the composition. Type 2 gelose must not exceed 66⅔ percent of the gelose fraction. Preferably the type 2 gelose should not exceed 50 percent of the gelose fraction.

The neutral high polymer preferably may make up to 50 percent of the composition without unduly developing high elasticity in the gels. The preferred range for percentage of locust bean gum in the composition is 30 to 40 percent.

The potassium chloride may make up as high as 50 percent of the composition, the preferred range of this salt is 20 to 30 percent.

From the foregoing it may be seen that the invention provides a four-element gel system in which the less expensive geloses of the agar type may be used to a large extent in place of the more expensive geloses of the Irish moss type while at the same time producing gels of equal or greater breaking strength and elasticity characteristics as gels whose gelose content is made entirely of the more expensive Irish moss type with concomitant saving in the cost of the final product.

Although a gelling composition made in accordance with the invention is particularly useful for producing gels for food purposes, it is also useful for industrial and other purposes. For example, a gel made from the gelling composition is well suited for making dental impressions.

The terms and expressions which have been employed herein are used as terms of description and not of limitation, and there is no intention in the use of such terms and expressions of excluding any equivalent of the features shown

What is claimed is:

1. A gelling composition capable of inducing a high degree of elasticity in a gel system formed therefrom which comprises a mixture of four elements, namely, gelose of the Irish moss type, agar, a neutral high polymer, and a cation-containing salt, said gelose being present in the mixture in an amount which is from 33% to 66% of the combined weight of said gelose and said agar, said neutral high polymer being present in the mixture in an amount which is 30% to 50% of the combined weight of said four elements, and the amount of cation-containing salt being present in the mixture in an amount which is 20% to 50% of the combined weight of said four elements.

2. A gelling composition capable of inducing a high degree of elasticity in a gel system formed therefrom containing Irish moss gelose, agar, locust bean gum and potassium chloride, said Irish moss gelose being present in an amount which is from 33% to 66% by weight of the total weight of the Irish moss gelose and agar combined, locust bean gum being present in an amount which is from 30% to 50% by weight of the total weight of the aforesaid four elements combined, and the potassium chloride being present in an amount which is from 20% to 50% of the total weight of the aforesaid four elements combined.

3. A gelling composition capable of inducing a high degree of elasticity in a gel system formed therefrom containing four elements, namely, Irish moss gelose, agar, locust bean gum and potassium chloride, the amount of agar present not exceeding 50% by weight of the combined weight of Irish moss gelose and agar, the amount of locust bean gum present being from 30% to 40% by weight of the combined weight of said four elements and the amount of potassium chloride present being from 20% to 30% by weight of the combined weight of said four elements.

4. A gelling composition capable of inducing a high degree of elasticity in a gel system formed therefrom which comprises a mixture of four elements, namely, gelose of Irish moss type, agar, locust bean gum and potassium chloride, said gelose in said mixture being from 33% to 66% of the combined weight of said gelose and agar and said agar in said mixture not exceeding 50% of the combined weight of said gelose and agar, said locust bean gum in said mixture being from 30% to 50% of the combined weight of said four elements, said potassium salt in said mixture being from 20% to 50% of the combined weight of said four elements; said mixture also containing sugar, buffer salt and acid.

GEORGE L. BAKER.

References Cited in the file of this patent
UNITED STATES PATENTS

| Number | Name | Date |
|---|---|---|
| 2,466,146 | Baker | Apr. 5, 1949 |